United States Patent
Feng

(10) Patent No.: US 7,768,741 B2
(45) Date of Patent: Aug. 3, 2010

(54) MAGNETIC WRITE HEAD DESIGN FOR REDUCING WIDE AREA TRACK ERASURE

(75) Inventor: Joseph Feng, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 909 days.

(21) Appl. No.: 11/438,997

(22) Filed: May 22, 2006

(65) Prior Publication Data

US 2007/0268623 A1    Nov. 22, 2007

(51) Int. Cl.
   *G11B 5/187* (2006.01)
(52) U.S. Cl. .................. 360/125.03; 360/125.06; 360/125.3
(58) Field of Classification Search ......... 360/125.03, 360/125.3, 125.32, 125.06
   See application file for complete search history.

(56) References Cited

U.S. PATENT DOCUMENTS

| | | | | |
|---|---|---|---|---|
| 4,380,784 | A |   | 4/1983 | Desserre et al. ............. 360/126 |
| 4,796,241 | A | * | 1/1989 | Hayakawa et al. ......... 369/13.17 |
| 4,971,947 | A | * | 11/1990 | Barnes et al. .............. 505/171 |
| 5,075,280 | A | * | 12/1991 | Pisharody et al. .......... 505/171 |
| 5,270,987 | A | * | 12/1993 | Kaku et al. .............. 369/13.02 |
| 5,438,747 | A |   | 8/1995 | Krounbi et al. .............. 29/603 |
| 6,031,695 | A |   | 2/2000 | Hsiao et al. ................ 360/126 |
| 6,104,574 | A |   | 8/2000 | Takano et al. .............. 360/126 |
| 6,111,723 | A |   | 8/2000 | Takano et al. .............. 360/122 |
| 6,278,578 | B1 |   | 8/2001 | Takano et al. .............. 360/122 |
| 6,304,415 | B1 |   | 10/2001 | Tateyama et al. ........... 360/126 |
| 6,317,290 | B1 |   | 11/2001 | Wang et al. ................ 360/126 |
| 6,324,035 | B2 |   | 11/2001 | Shiroishi .................... 360/317 |
| 6,373,657 | B1 |   | 4/2002 | Kamijima ................... 360/126 |
| 6,407,885 | B1 |   | 6/2002 | Ahagon et al. ............. 360/126 |
| 6,407,892 | B2 |   | 6/2002 | Shiroishi .................... 360/317 |
| 6,580,586 | B1 |   | 6/2003 | Biskeborn .................. 360/319 |
| 6,661,605 | B1 |   | 12/2003 | Pust et al. .................. 360/126 |
| 6,669,855 | B2 |   | 12/2003 | Sasaki et al. ................. 216/22 |
| 6,683,749 | B2 |   | 1/2004 | Daby et al. ................. 360/125 |
| 6,687,084 | B2 | * | 2/2004 | Takahashi et al. ....... 360/125.13 |
| 6,798,615 | B1 | * | 9/2004 | Litvinov et al. ......... 360/125.17 |
| 6,898,053 | B1 | * | 5/2005 | Khizroev et al. ........ 360/125.04 |
| 7,403,354 | B2 | * | 7/2008 | Pust et al. .............. 360/125.31 |
| 2005/0068669 | A1 | * | 3/2005 | Hsu et al. ................... 360/125 |
| 2005/0213246 | A1 | * | 9/2005 | Kief et al. .................. 360/125 |
| 2005/0280935 | A1 | * | 12/2005 | Clinton et al. .............. 360/125 |
| 2006/0193081 | A1 | * | 8/2006 | Pust et al. .................. 360/128 |

(Continued)

*Primary Examiner*—Jefferson Evans
(74) *Attorney, Agent, or Firm*—Zilka-Kotab, PC

(57) ABSTRACT

A magnetic write design for reducing Wide Area Track Erasure (WATEr). The write head design includes a magnetic pole and a non-magnetic, electrically conductive eddy current confining structure (ECC structure) formed adjacent to the write pole at the air bearing surface (ABS). The design can be embodied in a longitudinal write head having a magnetic pole, such as a P2 pole pedestal, with a non-magnetic, electrically conductive material surrounding three sides of the pole. For further protection against WATEr, a first, or bottom pole (P1) can be constructed with a high permeability, high Bs material at the write gap, and a low permeability, low Bs material formed there under. Another layer of high permeability, high Bs material can optionally be provided beneath the low permeability low Bs material layer. The invention can also be embodied in a perpendicular write head having a write pole with a non-magnetic, electrically conductive material surrounding all or a portion of the write pole at the ABS.

3 Claims, 7 Drawing Sheets

U.S. PATENT DOCUMENTS

2007/0211377 A1* 9/2007 Sasaki et al. ................ 360/126
2007/0297081 A1* 12/2007 Nazarov et al. ............... 360/59
2008/0022508 A1* 1/2008 Sasaki et al. ............. 29/603.01
2008/0137224 A1* 6/2008 Gao et al. ..................... 360/55
2008/0259493 A1* 10/2008 Kief et al. .............. 360/119.01
2009/0162699 A1* 6/2009 Sasaki et al. ................ 428/812
2010/0061199 A1* 3/2010 Hirara et al. ............. 369/13.24

* cited by examiner

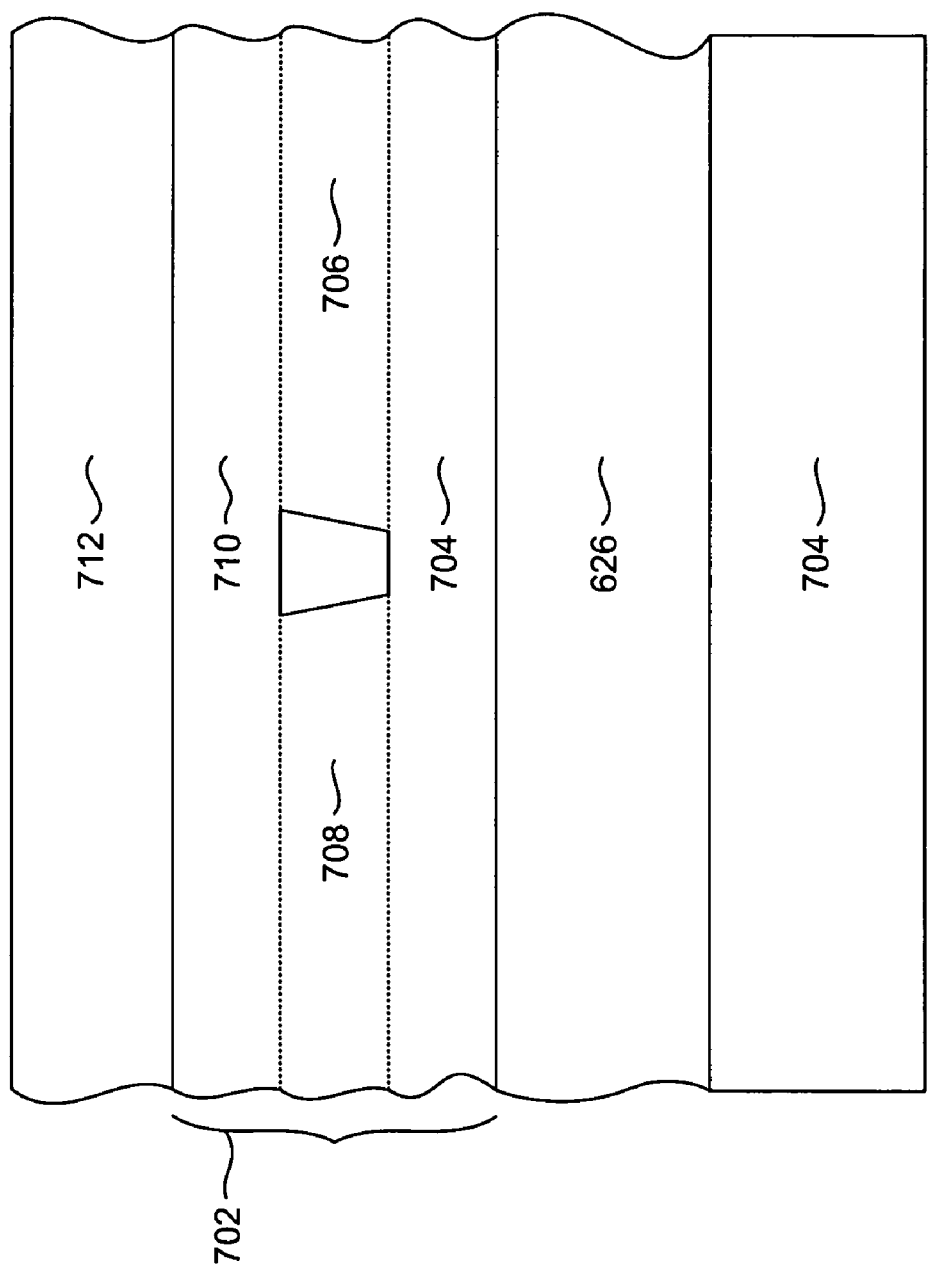

MAGNETIC WRITE HEAD DESIGN FOR REDUCING WIDE AREA TRACK ERASURE

FIELD OF THE INVENTION

The present invention relates to magnetic recording and more particularly to a novel write head design for reducing adjacent track interference, especially wide angle track erasure (WATEr).

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in first, second and third insulation layers (insulation stack), the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In recent read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In order to meet the ever increasing demand for improved data rate and data capacity, researchers have recently been focusing their efforts on the development of perpendicular recording systems. A traditional longitudinal recording system, such as one that incorporates the write head described above, stores data as magnetic bits oriented longitudinally along a track in the plane of the surface of the magnetic disk. This longitudinal data bit is recorded by a fringing field that forms between the pair of magnetic poles separated by a write gap.

A perpendicular recording system, by contrast, records data as magnetization oriented perpendicular to the plane of the magnetic disk. The magnetic disk has a magnetically soft underlayer covered by a thin magnetically hard top layer. The perpendicular write head has a write pole with a very small cross section and a return pole having a much larger cross section. A strong, highly concentrated magnetic field emits from the write pole in a direction perpendicular to the magnetic disk surface, magnetizing the magnetically hard top layer. The resulting magnetic flux then travels through the soft underlayer, returning to the return pole where it is sufficiently spread out and weak that it will not erase the signal recorded by the write pole when it passes back through the magnetically hard top layer on its way back to the return pole.

The need for ever increased data density pushes researchers to design recording systems with ever decreasing track widths and track densities. This is, of course, because decreased track width and increased track density means a greater number of tracks of data can be fit onto a given area of a magnetic medium. However, this push for decreased track width and increased track density has lead to an increase in adjacent track interference and what has been called "wide area track erasure" or "WATEr".

For example, it has been found that in longitudinal recording systems magnetic fields from the write poles have caused data erasure in tracks as far away as 1.5 um from the intended write track. A similar effect has been observed in perpendicular recording systems.

Therefore, there is a strong felt need for a write head design that can reduce stray magnetic fields and prevent them from affecting other unintended data tracks. A design for reducing such stray fields is needed for longitudinal recording systems and also for perpendicular recording systems.

SUMMARY OF THE INVENTION

The present invention provides a magnetic write head that reduces Wide Area Track Erasure (WATEr). The write head according to the invention includes a write pole having an end disposed at an air bearing surface (ABS) and a layer of nonmagnetic, electrically conductive material adjacent to a surface of the write pole at the ABS.

The write head can be embodied in a longitudinal write head having a first pole (P1) and a second pole portion (P2), with a non-magnetic gap layer sandwiched between the P1 and P2 poles. The P2 pole can be configured with first and second side surfaces and a top surface extending between the first and second side surfaces. A layer of non-magnetic, electrically conductive material can be formed at the first and second sides as well as the top of P2 pole near the ABS.

A longitudinal write head according to the invention can further prevent WATEr by constructing the P1 as a multilayer structure having a first magnetic layer constructed of a low permeability, low Bs material and a second magnetic layer constructed of a high permeability high Bs material formed over the first magnetic layer so as to be sandwiched between the first magnetic layer and the non-magnetic write gap layer. The P1 pole can also be constructed as a tri-layer structure to have a first or bottom magnetic layer constructed of a high permeability, high Bs material, as second layer of low permeability, low Bs material and a third layer of high permeability, high Bs material, with the second layer being sandwiched between the first and third layers.

A perpendicular write pole according to an embodiment of the invention can have a write pole with an end disposed at the ABS. A non-magnetic, electrically conductive material can then be formed to surround all or a portion of the write pole at the ABS.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

FIG. 7 is an ABS view, taken from line 6-6.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
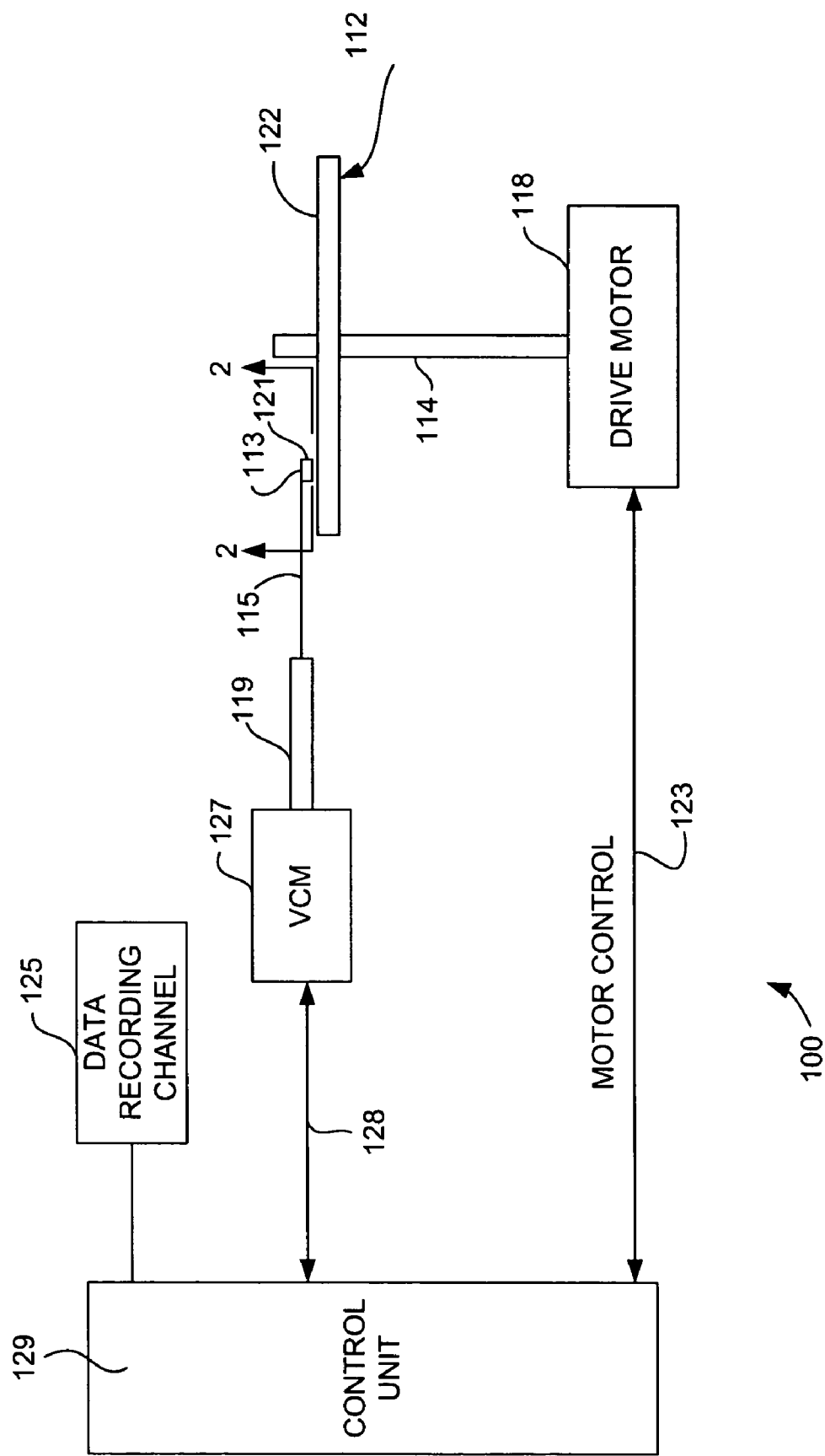
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
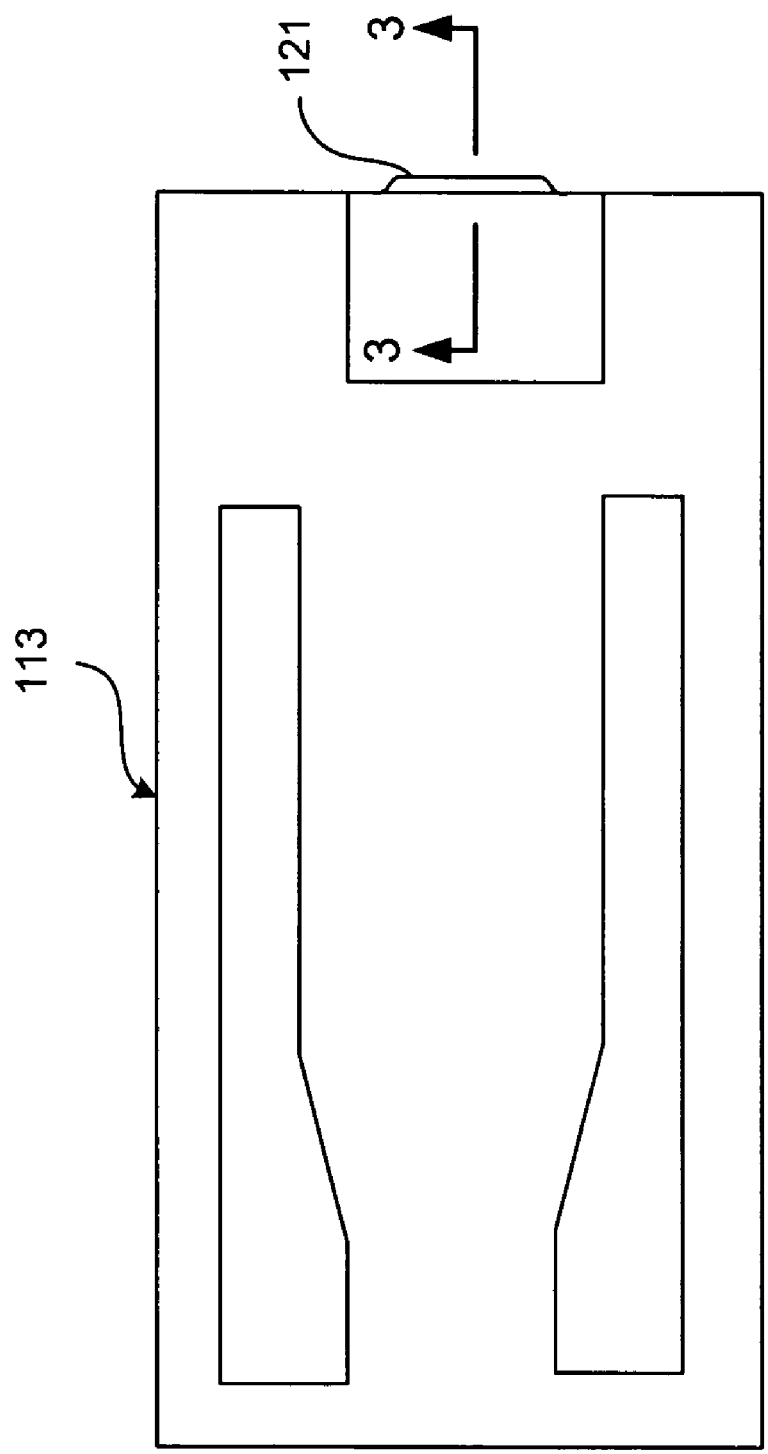
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
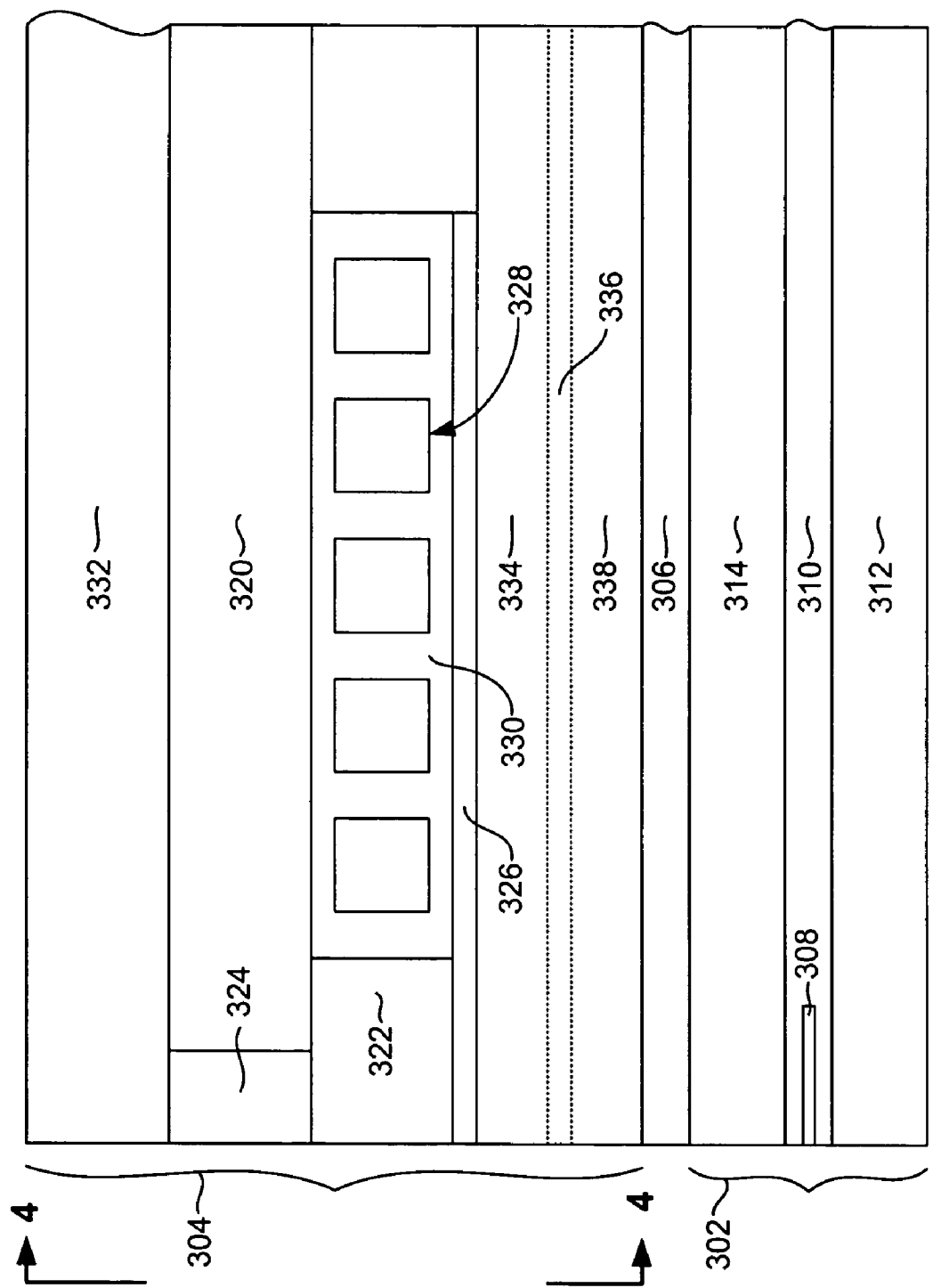
FIG. 3 is a cross sectional view, taken from line 3-3 of FIG. 2 and rotated 90 degrees counterclockwise, of a magnetic head according to an embodiment of the present invention.

With reference now to FIG. 3, a magnetic head 300 according to an embodiment of the present invention includes a read head 302 and a write head 304. The read head 302 and write head 304 may be separated from one another by a non-magnetic gap layer 306, which can be, for example, alumina. The read head 302 includes a magnetoresistive sensor 308, which may be a giant magnetoresistive sensor (GMR), tunnel valve, etc. The sensor 308 is embedded within a non-magnetic gap layer 310 such as alumina and is sandwiched between first and second magnetic shields 312, 314, which may be constructed of a magnetic material such as NiFe.

The write head 304 includes a bottom pole P1 316, having a pole tip end disposed near an air bearing surface ABS and a back end opposite the ABS. A magnetic back gap layer 318 is magnetically connected with the P1 pole at its back end. A magnetic top pole P3 320 is connected with the back gap layer 318 at its back end and is connected with a P2 pedestal layer 322 at its ABS end.

A non-magnetic write gap layer 326 separates the P1 pole 316 from the P2 pedestal 322 in the pole tip region near the ABS. An electrically conductive write coil 328 (shown partially and in cross section in FIG. 3) passes between the P1 and P3 poles 316, 320. The coil 328 can be constructed of, for example, Cu and is embedded in a non-magnetic, electrically insulating layer 330, which may be alumina, hard baked photoresist or a combination of these or other materials. A protective layer 332, constructed of a hard, non-magnetic material such as alumina may be provided above the P3 pole 320 to protect the structure from damage such as by abrasion, corrosion, etc. The top pole P3 320 can be recessed from the ABS, and a top non-magnetic, electrically conductive eddy current confining layer (top ECC layer) 324 can be provided above the P2 pedestal 322 between the P3 pole 320 and the ABS.

Figure 4:
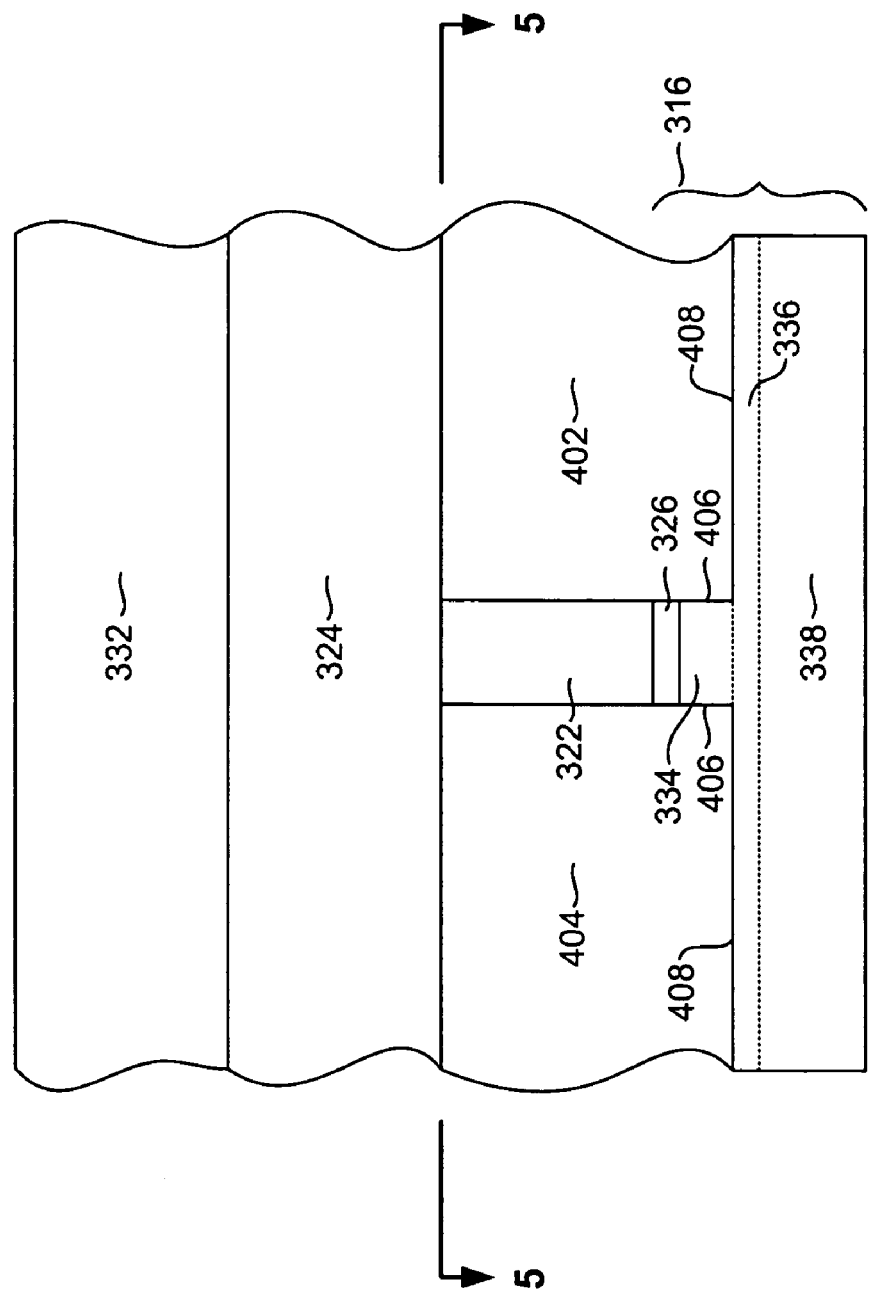
FIG. 4 is an ABS view of a write head according to an embodiment of the invention, taken from line 4-4 of FIG. 3.
Figure 5:
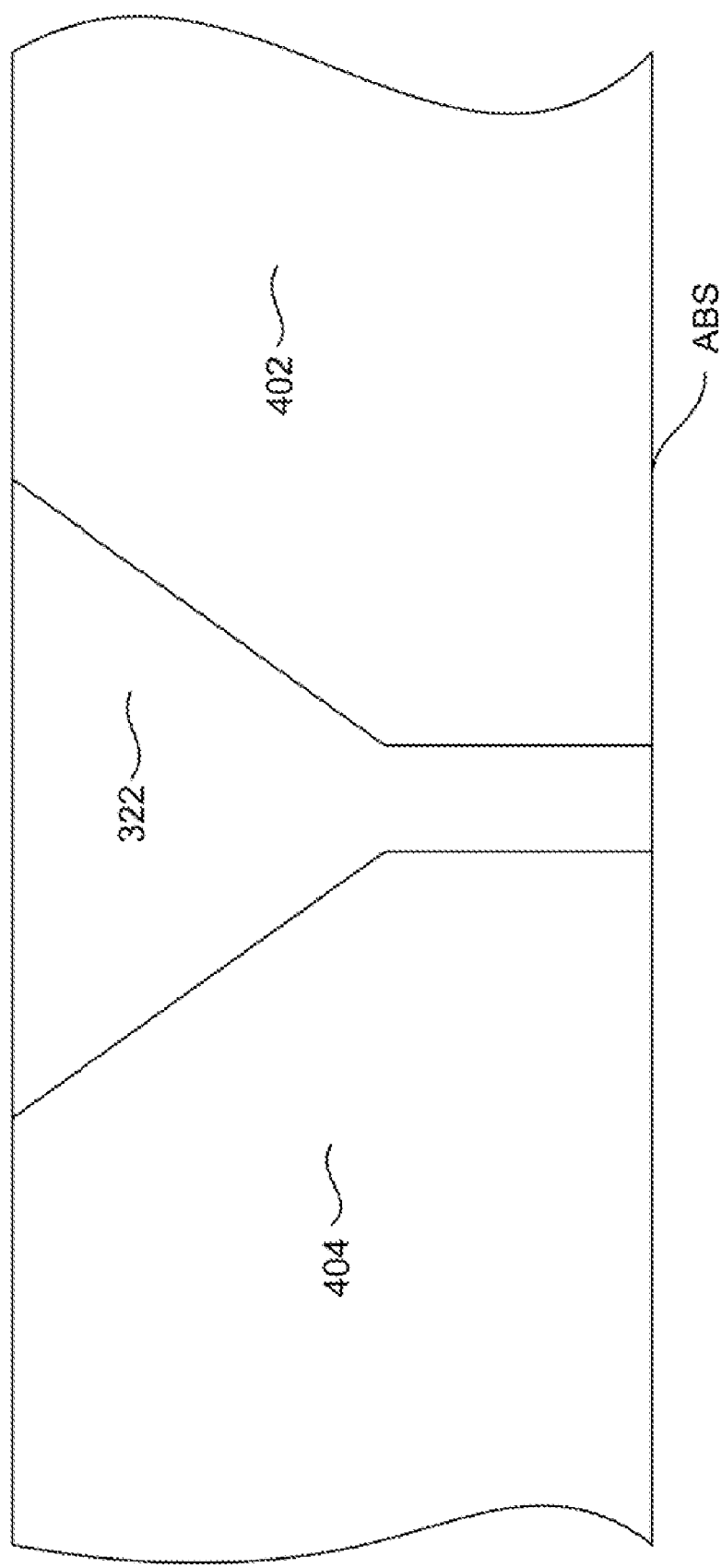
FIG. 5 is a top down view, taken from line 5-5 of FIG. 4.

With reference now to FIG. 4, as viewed from the air bearing surface (ABS), the write head includes first and second side non-magnetic, electrically conductive eddy current confining layers (side ECC layers) 402, 404. With reference to FIG. 5, the eddy current confining layers 402, 404 can extend to the ABS. Optionally, all or a portion of the eddy current confining layers 324, 402, 404 can be recessed from the ABS, in which case a non-magnetic, preferably non-corrosive fill material (not shown) could be disposed between the ABS and the eddy current confining layers 402, 404. These electrically conductive eddy current confining layers inhibit the magnetic flux path between the sides of P1 316 and the back portions of P2 322 away from the ABS. In addition to suppressing the magnetic flux conduction to the P1 316 sides, the top ECC layer 324 provides the benefit of confining the flux to the pole tip regions, thereby increasing the efficiency of the write element and improving the write performance of the recording system. The top ECC layer 324 is however, optional, and may be eliminated. If the top ECC layer 324 is eliminated, the P3 pole 332 could extend all of the way to the ABS, or else the top ECC layer 324 could be replaced with a protective fill layer of, for example, alumina. With reference to 5, it can be seen that the ECC layers 402, 404 can extend a significant amount from the ABS beyond the flare point 502 of the P2 pole 322, so long as the electrically conductive ECC layers 402, 404 are electrically insulated from the write coil 330.

With reference still to FIGS. 3 and 4, wide area track erasure (WATEr) can be further reduced by the use of a novel first pole structure 316. The first pole 316 includes layers of magnetic material having varying magnetic saturation properties (Bs). A top layer 334 having a high magnetic saturation value (high Bs) is provided adjacent to the write gap 326. Directly beneath the high Bs top layer 334 is a low permeability, low Bs magnetic material layer 336. A bottom, high permeability, high Bs material layer 338 may be provided beneath the low Bs material layer 336 to increase flux flow to the pole tip.

Therefore, at least two embodiments of the first pole P1 316 are possible. The P1 pole can be constructed as a bi-layer structure having a low permeability, low Bs bottom layer 336 and a high permeability, high Bs material at the top. Alternatively, the P1 pole structure 316 can be a tri-layer structure as described above, having a bottom layer 338 constructed of a high permeability, high Bs material, a low permeability, low Bs middle layer 336 and a high permeability, high Bs top layer 334 formed adjacent to the write gap 326. Preferably, the high Bs top layer 334 could be constructed of CoFe. The high Bs top layer 334 preferably has a saturation magnetization greater than 20,000 Gauss and may be 24,000 Gauss or greater, and has a high permeability. The low permeability, low Bs material layer 336 could be constructed of, for example, NiFeX, where X is Cu, Au, Cr, etc. The material X preferably is a material that can be readily electroplated. The low Bs material 336 preferably has a saturation magnetization of less than 5,000 Gauss and a low permeability. The bottom layer 338 (if a tri-layer structure is used), can be constructed of CoFe like the top layer 334, and can have a magnetization saturation greater than 20,000 Gauss, or 24,000 Gauss or greater, and has a high permeability.

With particular reference to FIG. 4, the P1 pole 316 has a notched pole tip portion 406 that is self aligned with the P2 pole 322 by an ion milling process that uses the P2 pole as a mask. This notched, pole tip portion 406 is preferably entirely, or nearly entirely, constructed of the high permeability, high Bs material 334. The P1 pole also has un-notched portions 408 that extend laterally from the base of the notched portion 406. The low permeability, low Bs material preferably starts at the elevation where the notched portion 406 meets the un-notched portions 408, so that the top surfaces of the un-notched portions 408 are constructed of the low permeability, low Bs material 336. The bottom high permeability, high Bs material 338 is then located below the low permeability, low Bs material layer 336.

This novel first pole 316 can be used in conjunction with or in lieu of the use of ECC layers 324, 402, 404 described above. Or, the ECC layers 324, 402, 404 can be used without the novel first pole structure 316.

Figure 6:
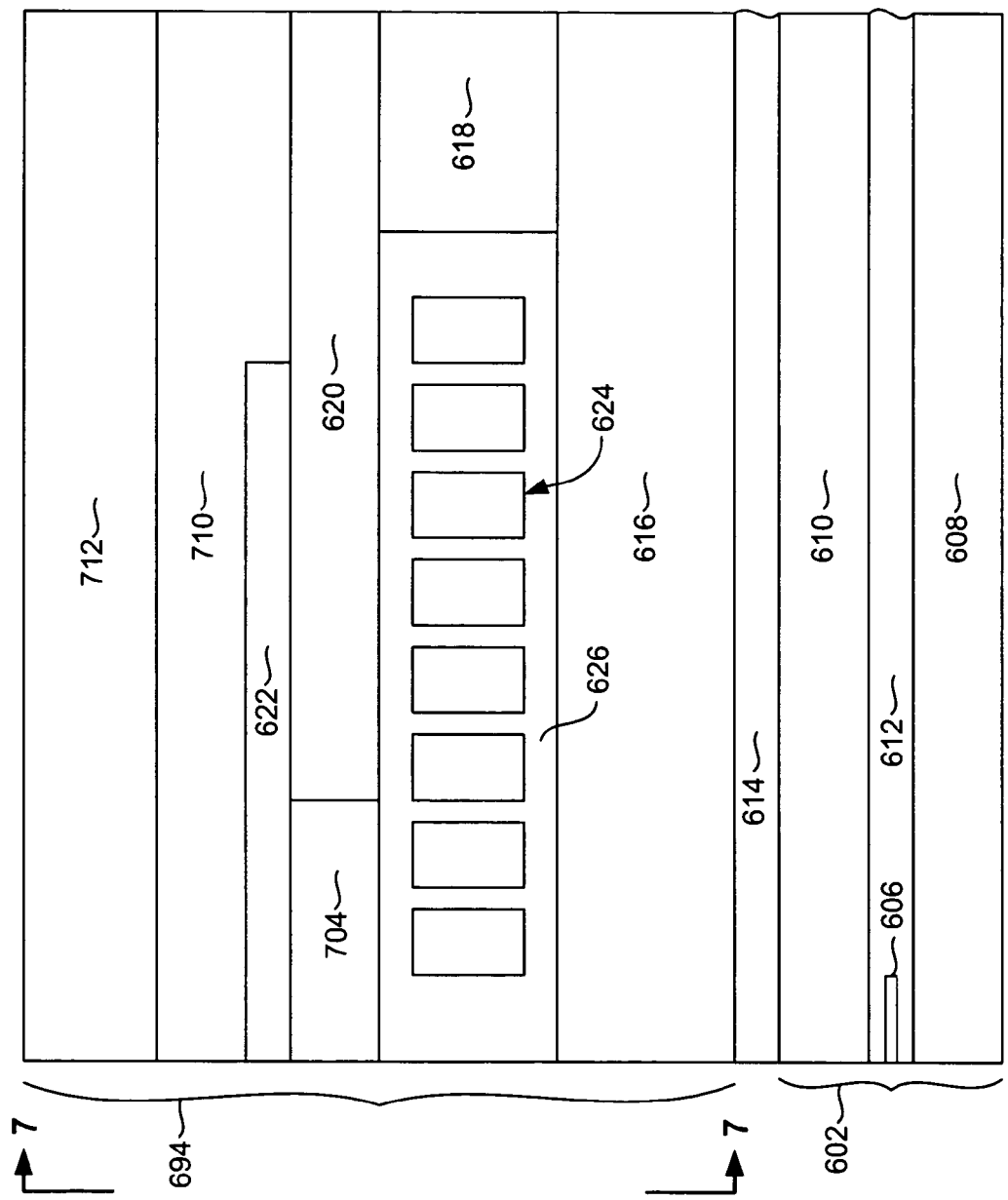
FIG. 6 is a cross sectional view of a magnetic head according to an alternate embodiment of the invention.

With reference now to FIG. 6, the invention can be embodied in a perpendicular recording head 600, which can include a read head 602 an a write head 604. The read head includes a magnetoresistive sensor 606 sandwiched between first and second magnetic shields 608, 610 and embedded in a non-magnetic gap layer 612. The read head 602 may be separated from the write head by a non-magnetic gap layer 614 such as alumina.

The write head includes a magnetic return pole 616, which is magnetically connected with a magnetic back gap layer 618 at a back end of the write head opposite the air bearing surface (ABS). The Back gap 618 is magnetically connected with a shaping layer 620, which extends toward, but not completely to the ABS. The return pole 616, back gap 618 and shaping layer 620 can be constructed NiFe or some other magnetic material. A write pole 622 is connected with the shaping layer 624 and preferably extends to the ABS. The write pole can be constructed of a high permeability, high Bs magnetic material or, more preferably can be constructed as a lamination of layers of high permeability, high Bs material separated by thin non-magnetic layers.

An electrically conductive write coil 624 passes between the shaping return pole 616, and the shaping layer 620 and write pole 622. The write coil 624 can be constructed of, for example Cu or some other electrically conductive material. The write coil is embedded in a non-magnetic, electrically insulating layer 626 such as alumina.

With reference now to FIG. 7, the write pole, as viewed from the ABS, is completely surrounded by an electrically conductive material, forming a surrounding eddy current confining structure (ECC structure) 702. This ECC structure 702 can be in the form of multiple layers, such as a bottom or leading edge ECC layer 704, first and second side ECC layers 706, 708, and a top or trailing edge ECC layer 710. The ECC layers 704, 706, 708, 710 can be constructed of, for example Cu. The ECC structure 702 could also be include only a portion of the layers 704, 706, 708, 710. For example, the top or trailing edge ECC could be eliminated and replaced with a layer of, for example alumina. Similarly, the bottom of leading ECC layer could be eliminated and replaced with a material such as alumina.

A protective top layer 712 can be provided at the top of the write head to protect the head 600 from damage such as by corrosion or abrasion. The protective top layer 712 can be constructed of, for example alumina. With reference again to FIG. 6, it can be seen that the all of the conductive ECC structure must be insulated from the electrically conductive coil 624 to prevent electrical shorting of the write current. The side ECC layers 706, 708 cannot be seen in FIG. 6, because the section shown in FIG. 6 is through the center of the write head. The side ECC layers 706, 708 are therefore into and out of the plane of the page in FIG. 6.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic write head for perpendicular magnetic recording, comprising:

a magnetic return pole having an end disposed at an air bearing surface (ABS) and a back end opposite the ABS;

a magnetic back gap magnetically connected with the return pole at the back end of the return pole;

a magnetic shaping layer magnetically connected with the back gap and extending toward, but stopping short of, the ABS;

a magnetic write pole magnetically connected with the shaping layer and extending to the ABS; and a non-magnetic, electrically conductive material surrounding and contacting the write pole near the ABS.

2. A magnetic write head as in claim 1 wherein the non-magnetic, electrically conductive material comprises Cu.

3. A magnetic write head as in claim 1 wherein the non-magnetic, electrically conductive material is recessed from the ABS.

* * * * *